US011456639B2

(12) United States Patent
Foley et al.

(10) Patent No.: US 11,456,639 B2
(45) Date of Patent: Sep. 27, 2022

(54) ROTOR FOR AN ELECTRIC MOTOR (71) Applicants: Equipmake Ltd, Snetterton (GB); aim Co. Ltd., Nagoya (JP)

(72) Inventors: Ian Foley, Snetterton (GB); Rob Williamson, Snetterton (GB); Angel Asorey Blasquez, Snetterton (GB)

(73) Assignees: Equipmake Ltd, Snetterton (GB); aim Co. Ltd., Nagoya (JP)

( * ) Notice: Subject to any disclaimer, the term of this patent is extended or adjusted under 35 U.S.C. 154(b) by 135 days.

(21) Appl. No.: 16/616,024

(22) PCT Filed: May 22, 2018

(86) PCT No.: PCT/GB2018/051382
§ 371 (c)(1),
(2) Date: Nov. 22, 2019

(87) PCT Pub. No.: WO2018/215753
PCT Pub. Date: Nov. 29, 2018

(65) Prior Publication Data
US 2020/0119609 A1 Apr. 16, 2020

(30) Foreign Application Priority Data
May 24, 2017 (GB) ..................................... 1708314

(51) Int. Cl.
*H02K 1/32* (2006.01)
*H02K 1/27* (2022.01)
(Continued)

(52) U.S. Cl.
CPC ............... *H02K 1/32* (2013.01); *H02K 1/276* (2013.01); *H02K 1/30* (2013.01)

(58) Field of Classification Search
CPC ........ H02K 1/32; H02K 1/276; H02K 1/2773; H02K 1/30; H02K 2213/03; H02K 9/19; H02K 21/14; H02K 9/197
(Continued)

(56) References Cited

U.S. PATENT DOCUMENTS 3,031,593 A    4/1962  Cametti
4,445,062 A *  4/1984  Glaser .................. H02K 1/2773
                                              310/156.59
(Continued)

FOREIGN PATENT DOCUMENTS

DE    102009029716 A1    12/2009
DE    102009025929 A1    12/2010
(Continued)

OTHER PUBLICATIONS

English language abstract of Japanese Patent Publication No. JP 2001190047 A, European Patent Office, dated Jul. 10, 2001.
(Continued)

Primary Examiner — Alex W Mok
(74) Attorney, Agent, or Firm — Dascenzo Gates Intellectual Property Law, P.C.

(57) ABSTRACT

A hub for a rotor of a permanent magnet motor comprises fluid conduits which extend radially outwardly to a region radially beneath each magnet of the motor and then radially inwardly. A rotor of a permanent magnet motor is also provided which includes a hub body having a plurality of lugs on an outer circumferential surface of the hub body, each lug substantially consisting of a tapered base portion and a head portion. The maximum width of the base portion of each lug in the circumferential direction substantially corresponds to the circumferential distance between the adjacent permanent magnets. Furthermore, a rotor of a permanent magnet motor comprises rotor segments having
(Continued)

axially extending grooves defined in a radially extending sidewall of each rotor segment.

9 Claims, 7 Drawing Sheets

(51) Int. Cl.
  *H02K 1/30* (2006.01)
  *H02K 1/276* (2022.01)
(58) Field of Classification Search
  USPC .......................................................... 310/52
  See application file for complete search history.

(56) References Cited

U.S. PATENT DOCUMENTS

| | | |
|---|---|---|
| 4,498,024 A | 2/1985 | Moretti et al. |
| 4,999,533 A | 3/1991 | King et al. |
| 5,347,188 A | 9/1994 | Iseman et al. |
| 5,786,650 A | 7/1998 | Uchida et al. |
| 5,952,755 A | 9/1999 | Lubas |
| 6,762,520 B1 | 7/2004 | Ehrhart et al. |
| 8,446,121 B1 | 5/2013 | Parsa et al. |
| 8,928,195 B2 * | 1/2015 | Ohashi ................... H02K 7/088 310/54 |
| 10,483,817 B2 | 11/2019 | Sakurai et al. |
| 2002/0047424 A1 | 4/2002 | Varenne |
| 2004/0004407 A1 | 1/2004 | Laurent et al. |
| 2006/0113851 A1 | 6/2006 | Ishihara et al. |
| 2008/0024018 A1 | 1/2008 | Rignault et al. |
| 2008/0136271 A1 | 6/2008 | Alfermann et al. |
| 2010/0231067 A1 | 9/2010 | Ruffing et al. |
| 2010/0289386 A1 | 11/2010 | Gerstler et al. |
| 2012/0326548 A1 | 12/2012 | Nonaka |
| 2013/0049493 A1 | 2/2013 | Zhao et al. |
| 2014/0103771 A1 | 4/2014 | Figgins et al. |
| 2014/0175916 A1 | 6/2014 | Chamberlin |
| 2014/0191609 A1 | 7/2014 | Woo et al. |
| 2015/0288255 A1 | 10/2015 | Barker |
| 2016/0156251 A1 | 6/2016 | Sakurai et al. |
| 2016/0329760 A1 | 11/2016 | Major |

FOREIGN PATENT DOCUMENTS

| | | |
|---|---|---|
| EP | 2562914 A1 | 2/2013 |
| EP | 2658098 A1 | 10/2013 |
| GB | 2501952 A | 11/2013 |
| JP | 31863 Y | 12/1926 |
| JP | S59-113754 A | 6/1984 |
| JP | 2001190047 A | 7/2001 |
| JP | 2010288373 A | 12/2010 |
| WO | WO 2011/012131 A2 | 2/2011 |
| WO | WO 2011/156513 A2 | 12/2011 |

OTHER PUBLICATIONS

English language abstract of German Patent Publication No. DE 102009025929 A1, European Patent Office, dated Dec. 9, 2010.
English language machine translation of Japan Patent Publication No. JP 2010288373 A, European Patent Office, dated Dec. 24, 2010.
English language abstract of PCT Patent Publication No. WO 2011/012131 A2, European Patent Office, dated Feb. 3, 2011.
Search Report issued in connection with United Kingdom Patent Application No. GB 1708314.8, 1 page, United Kingdom Intellectual Property Office, dated Jul. 19, 2018.
English language machine translation of German Patent Publication No. DE 102009029716 A1, Google Patents, Dec. 24, 2009.
English language abstract of Japan Utility Model Publication No. JP 31863 Y, Dec. 13, 1926.
English language machine translation of Japan Patent Publication No. JP S59-113754 A, European Patent Office, dated Jun. 30, 1984.

\* cited by examiner

ROTOR FOR AN ELECTRIC MOTOR

FIELD OF THE DISCLOSURE

The present disclosure relates to a rotor suitable for use in an electric motor. More particularly, it concerns a rotor for a permanent magnet motor.

BACKGROUND TO THE DISCLOSURE

A rotor for a permanent magnet motor generally includes a central hub with sets of permanent magnets and rotor segments arranged around its periphery. One set is interposed between the other. Such rotors may operate at very high rotational speeds and so the rotor needs to be designed so as to retain the magnets and segments in position against high centrifugal forces.

SUMMARY OF THE DISCLOSURE

The present disclosure provides a hub for a rotor of a permanent magnet motor, the hub comprising a hub body for supporting a plurality of permanent magnets and having a central axis of rotation, a fluid inlet for receiving a fluid coolant, a fluid outlet of outputting the fluid coolant, and fluid conduits which are coupled to the inlet and outlet, wherein the fluid conduits define a set of separate fluid paths, each fluid path of the set extending radially outwardly to a region radially beneath a respective magnet and then radially inwardly.

The properties of the rotor may be improved by controlling its temperature using an internal cooling arrangement. According to the disclosure, a network of fluid conduits is provided within the hub body which is arranged to direct coolant towards and away from a region radially beneath each magnet. This was found to be particularly effective as it enables heat to be extracted from adjacent magnets. This allows the use of higher flux density materials which usually operate at lower temperatures. Also, whilst it is desirable to use lighter materials to foam the hub body, the strength of such materials may be significantly reduced at higher temperatures. By inclusion of an active cooling system for the rotor which circulates a fluid through internal passages within the hub body, the rotor may be rotated at higher speeds than would otherwise be possible with some materials.

The hub body may be in the form of an assembly of separate components. The fluid inlet is fluidically coupled to the set of fluid conduits which are in turn fluidically coupled to the fluid outlet. The part of the fluid path which passes through the region radially beneath a respective magnet may be circumferentially confined to a portion of the body radially below the respective magnet.

In a preferred example, each fluid path of the set extends radially outwardly, then axially in a region radially beneath a respective magnet, and then radially inwardly. In this way, the length of fluid path in close proximity to the magnet may be increased.

The hub body may include a set of chambers, wherein each chamber of the set is located radially beneath a respective magnet, and each one of the set of fluid paths passes through a respective one of the set of chambers. A cross-sectional area of each chamber in a plane transverse to the direction of fluid flow may be greater than that of the fluid channels leading into and away from the chamber. This may increase the volume of fluid coolant in a region adjacent to each magnet to enhance the cooling effect.

Preferably, each chamber is elongated in the axial direction. This may increase the length of the chamber adjacent to the periphery of the hub body in the axial direction.

The hub body preferably includes a central chamber for receiving fluid coolant from the inlet, and each fluid path extends along a respective separate channel directly connected to the central chamber. This enables fluid coolant flowing into the hub body from the fluid inlet to be distributed between the separate fluid paths. Preferably, a circumferential wall of the chamber smoothly blends into walls which define the channels. It was found that, in the absence of such a smooth transition, regions of separated and recirculating flow tended to develop at the ends of the channels adjacent to the chamber due to the difference in the rotational velocity of the fluid in the chamber and the rotor. This led to a substantial pressure drop. In a preferred configuration, a radiused, curved surface is defined at the interface between the chamber and the radial channels in order to provide a smoother transition for the fluid flow.

The central chamber may include a structure for exerting rotational forces on fluid in the chamber to increase its rotational velocity. The structure may comprise a plurality of radially extending members. These members may be elongated in the radial direction. This may serve to reduce the difference between the rotational velocity of fluid in the chamber relative to that of fluid flowing in the radial channels, and thereby reduce any pressure drop experienced as fluid flows from the chambers to the channels.

The central chamber may include a plurality of vanes for imparting rotational velocity to coolant flowing through the chamber. The vanes may be located on a transversally extending wall of the central chamber which faces towards a port from which fluid coolant is fed into the chamber.

In a preferred example, the hub body is substantially formed from an aluminium alloy. Provision of a cooling system within the rotor as described herein may allow a hub body formed of such material to operate reliably at higher rotational speeds than would otherwise be the case. It minimises deformation of the hub body which would otherwise occur at elevated temperatures.

The present disclosure also provides a rotor for a permanent magnet motor, the rotor comprising a hub as described herein and a plurality of permanent magnets supported by the hub. Preferably, the magnets are mounted in direct contact with the hub body. This may serve to improve transfer of heat from the magnets into the hub body which may then be transferred away by the cooling system. In a preferred configuration, each magnet is elongated in the axial direction. With the adjacent fluid path of the cooling arrangement also elongated in the axial direction, efficient removal of heat energy from the magnets may be facilitated.

Furthermore, the present disclosure provides a rotor of a permanent magnet motor, the rotor comprising a hub body having a central axis of rotation, a plurality of lugs provided on an outer circumferential surface of the hub body, each lug substantially consisting of a tapered base portion and a head portion, the base portion having a width in the circumferential direction which decreases substantially continuously in the radially outwards direction from a maximum width to where it meets the head portion, and the head portion substantially consisting of an inner region over which its width in the circumferential direction increases in the radially outwards direction and an outer region over which its circumferential width decreases to zero in the radially outwards direction; a plurality of rotor segments engaged with respective lugs; and a plurality of permanent magnets located between adjacent rotor segments, wherein the maximum width of the base portion of each lug in the circumferential direction substantially corresponds to the circumferential distance between the adjacent permanent magnets.

This hub body configuration may allow mechanical stresses to be kept within acceptable limits. Providing a wide base for each lug has found to improve its resistance to both centrifugal and rotational loads. It was determined that providing a wide base would have a minimal effect on the magnetic performance of the rotor as the flux density is relatively low at the base of each rotor segment. Also, removal of further material from the rotor segment to accommodate a wider lug base reduces the weight of the rotor segment and therefore the centrifugal load that it exerts on the lug.

Preferably, the base portion of each lug tapers inwardly from its maximum width in the radially outwards direction. It was determined that the stresses exerted on the lug are higher nearer its base and so they are better accommodated by providing a maximum width at the base portion from which it tapers inwardly in the radially outwards direction.

In a preferred example, combination of a wide lug base with a single enlarged head portion of the lug (rather than a series of enlarged portions) was found to provide a strong mechanical coupling.

In a further preferred example, the ratio of (a) the thickness of each rotor segment in the circumferential direction adjacent the widest part of the head portion of the respective lug to (b) half the thickness of the narrowest part of the neck portion of the respective lug is in the range 1.35 to 1.65. This was found to be particularly advantageous where the rotor segments and lugs are formed of materials having similar strengths (such as laminated steel and high strength aluminium alloy).

Preferably, the radial distance to which each lug extends into the respective rotor segment is greater than 40% of the radial height of the rotor segment. This may provide more secure coupling between the lug and the rotor segment, whilst still leaving a sufficient depth of rotor segment above the lug to be linked by magnetic flux.

In addition, the present disclosure provides a rotor of a permanent magnet motor, the rotor comprising a hub body having a central axis of rotation, a plurality of rotor segments arranged around the hub body; and a plurality of permanent magnets located between adjacent rotor segments, wherein a portion of each rotor segment extends circumferentially at least partway over an adjacent magnet to restrain the magnet against radially outwards forces, and an axially extending groove is defined in a radially extending sidewall of each rotor segment adjacent to its circumferentially extending portion. This groove may serve to reduce the mechanical stresses exerted on the material of the rotor segment adjacent to the circumferentially extending portion as it restrains the adjacent magnet against centrifugal forces.

In a preferred example, the groove is substantially semicircular in a cross-sectional plane which extends transversely with respect to the axis of rotation. This shape was found to provide a good compromise between the volume of material removed from the rotor segment and the stresses it is able to resist.

BRIEF DESCRIPTION OF THE DRAWINGS

Examples of the disclosure will now be described by way of example and with reference to the accompanying schematic drawings wherein.

DETAILED DESCRIPTION OF THE DRAWINGS

Figure 1:
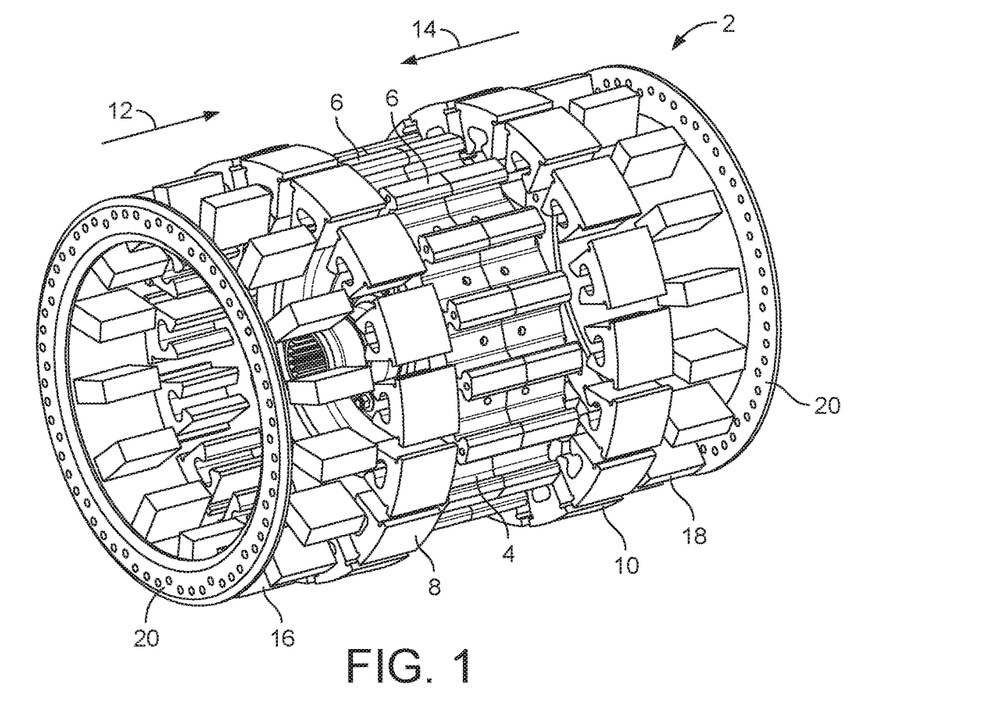
FIG. 1 is an exploded perspective view of a motor rotor according to the present disclosure.

A motor rotor 2 in accordance with the present disclosure is depicted in FIG. 1. It has a central hub body 4. A set of lugs 6 project radially outwardly from an outer circumferential surface of the hub body and are evenly spaced around its circumference. Each lug 6 is elongated in the axial direction with a constant transverse cross-section. Two sets of rotor segments 8 and 10 are provided. Each rotor segment has a cut-out profile on its radially inner side, which complements the profile of the lugs. The rotor segments are therefore able to slide onto the lugs by moving set 8 in axial direction 12 and set 10 in the opposite axial direction 14.

The rotor segments are shaped so as to be able to retain a magnet from one of two sets 16 and 18 between each rotor segment and its immediate neighbour. Each pair of adjacent rotor segments, together with the hub body, define a slot shaped to receive one of the magnets by sliding the magnet into the slot in the axial direction. The rotor segments and magnets, once assembled onto the hub body 4 are then clamped into position by a pair of rings 20 which fasten onto axially opposite sides of the hub body.

A network of channels is defined within the hub body 4 to enable fluid coolant to be circulated within the body. This will now be described in more detail with reference to FIGS. 2 to 9.

Figure 2:
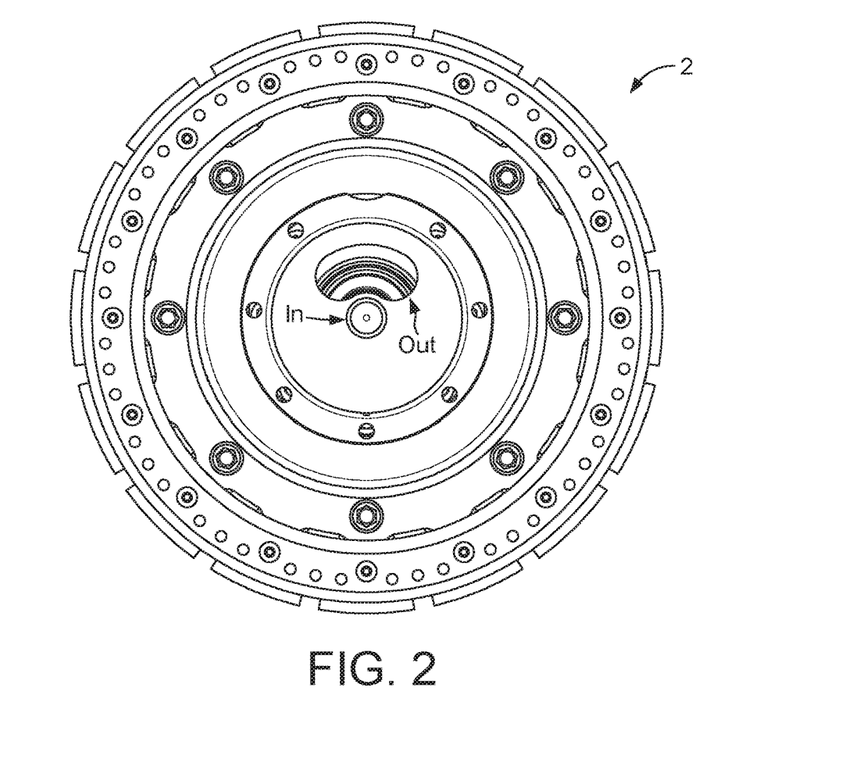
FIG. 2 is an end view of the motor rotor of FIG. 1.
Figure 3:
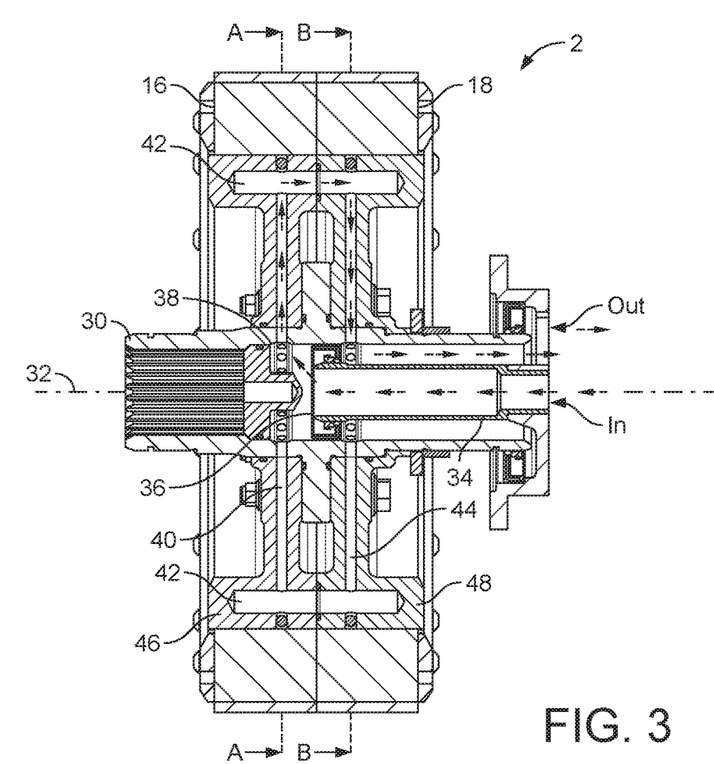
FIG. 3 is a cross-sectional side view of the motor rotor of FIG. 1.

Fluid is fed into the hub body via an inlet marked "IN" in FIG. 2 and flows out through an outlet marked "OUT" in FIG. 2. As can be seen in FIG. 3, the rotor has a central shaft 30 which is coaxial with its axis of rotation 32. A fluid inlet tube 34 is coaxially mounted within the shaft. Fluid flowing along tube 34 exits the tube at a port 36 and flows into a central chamber 38. A set of radially extending channels 40 is fluidically coupled to the central chamber. These channels are arranged to carry fluid from the central chamber to a set of respective peripheral chambers 42. Each chamber 42 is located radially inwardly from a corresponding pair of magnets 16, 18.

Each peripheral chamber is elongated in the axial direction. A second set of radially extending channels 44, which is axially spaced from the first set 40, is arranged to convey fluid from the set of peripheral chambers inwardly back to the shaft 30. The fluid then flows along the shaft, around the outside of tube 34, to the fluid outlet of the hub body.

Figure 4:
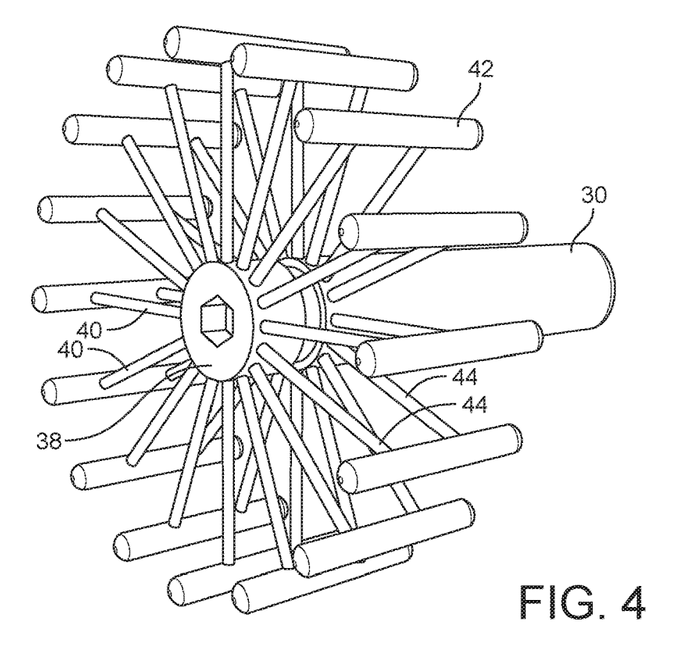
FIG. 4 is a perspective view of fluid conduits defined within the rotor of FIG. 1.

FIG. 4 shows a 3D model representing the fluid pathways within the hub body.

Figure 5:
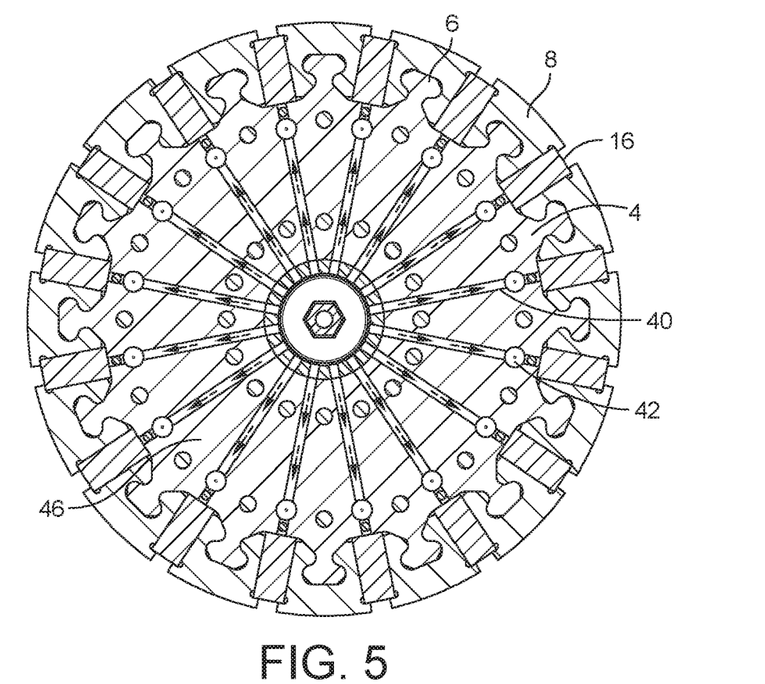
FIGS. 5 and 6 are transverse cross-sectional views of the motor rotor of FIG. 3 along lines A-A and B-B, respectively.
Figure 6:
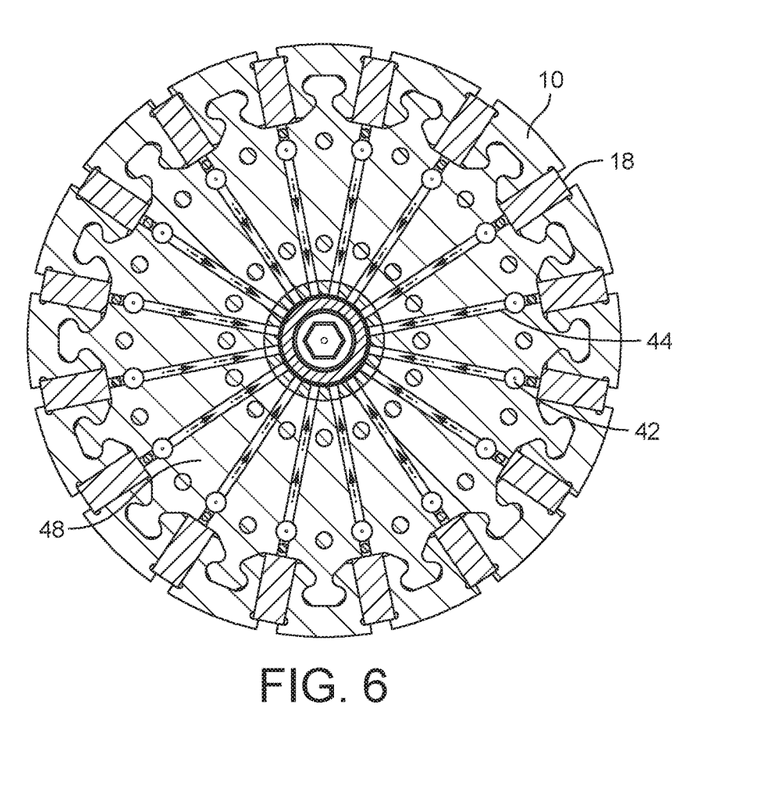

FIGS. 5 and 6 show transverse cross-sections through the hub body. It can be seen how each fluid path directs fluid coolant directly radially outwards to a chamber radially beneath each magnet and the fluid is then returned to the centre of the hub body along another radial path. A separate fluid path is provided in association with each magnet location.

As can be seen in FIG. 3, in the example illustrated, the hub body includes two hub portions 46 and 48. The set of radial channels 40 extends within hub portion 46, and the other set 44 extends within portion 48. Each hub portion is mounted onto the shaft 30.

It will be appreciated that this rotor configuration may be scaled to suit particular performance requirements.

The hub portions 46 and 48 are formed from a non-magnetic material. This material may be an austenitic stainless steel or a titanium alloy. In a preferred example, high strength aluminium alloy is used (for example 7075-T6) which allows for a lightweight rotor. With active cooling in the manner described herein, it is possible to control the temperature of the rotor so that elevated temperatures are not reached which would otherwise weaken the rotor material to an unacceptable extent.

The chambers may extend axially outwardly beyond one or both sets of radial channels to increase the length of the chamber which is in close proximity to the magnets 16, 18.

The outlet has a wide aperture so that the outward flow of the fluid coolant is not unnecessarily impeded.

Figure 7:
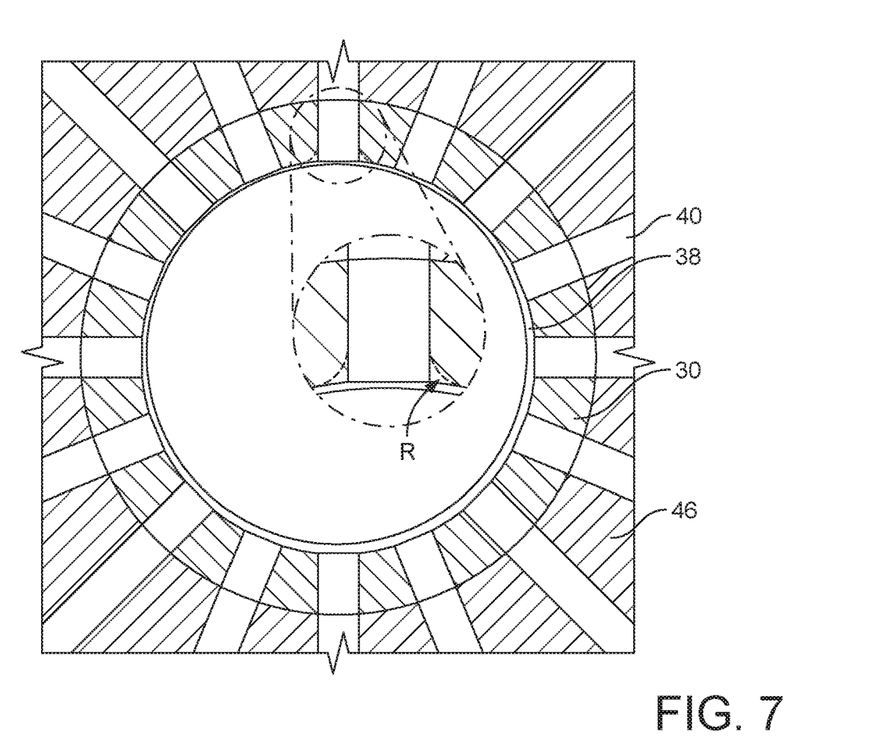
FIG. 7 is an enlarged cross-sectional view of the central chamber defined within the rotor of FIG. 1.

As illustrated in FIG. 7, a radius is preferably formed at the junction between each radial channel of set 40 and the central region of the rotor. This radius "R" provides a smoother transition between the central chamber 38 and the radial channels 40. This feature was devised as a result of simulations carried out during the development of the rotor, in which large regions of separated and recirculating flow were found at the inlet to the radial channels due to the discrepancy between the rotational velocity of fluid in the central chamber 38 and that of the rotor body. This caused the pressure drop across the fluid system within the rotor to increase sharply with rotational speed. The radiused junctions serve to counteract this effect by smoothing the flow from the central chamber into the radial channels.

Figure 8:
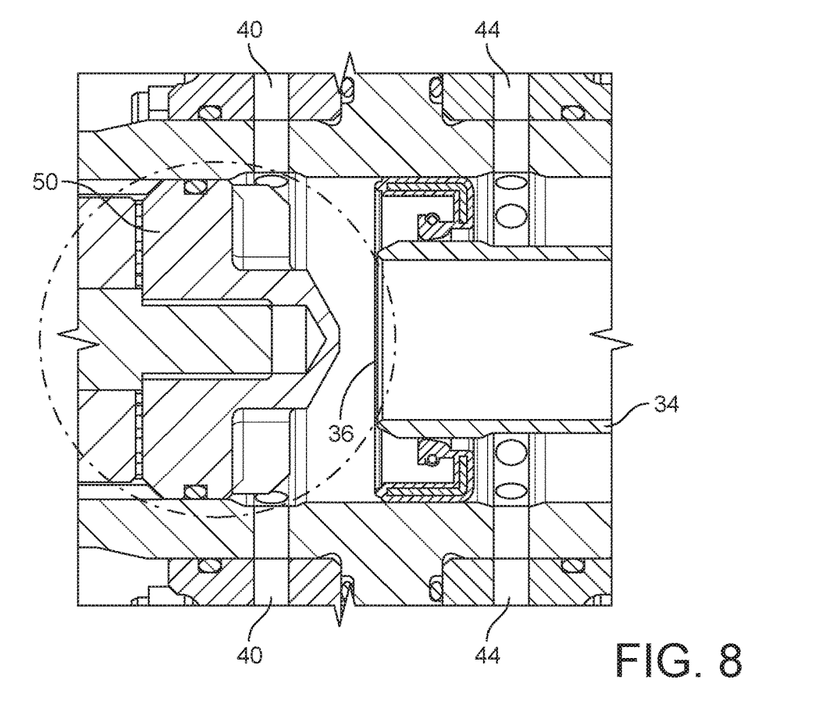
FIG. 8 is an enlarged cross-sectional side view of the central chamber of the rotor of FIG. 1.
Figure 9:
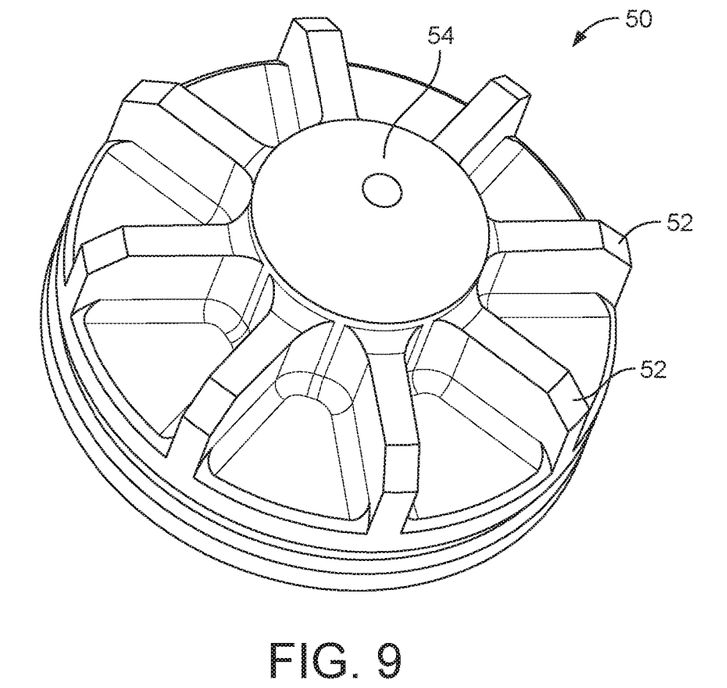
FIG. 9 is a perspective view of a component providing vanes in the central chamber.

Circulation of fluid within the rotor has been further enhanced by inclusion of a profiled component 50 in the central chamber 38. It is located opposite the inner port 36 of the tube 34. A set of radially extending raised ribs or vanes 52 is formed on a surface of the component 50 which faces towards the port 36. The vanes extend outwardly from a central hub 54 of the component. Component 50 rotates with the hub body. As it does so, it acts to increase the rotational velocity of fluid in the central chamber 30 before it transitions from the chamber into the radial channels 40. In the example illustrated, the vanes extend radially along respective straight lines.

The configuration of the lugs 6, rotor segments 8, 10 and magnets 16, 18, will now be described further with reference to FIGS. 10 to 15.

Figure 10:
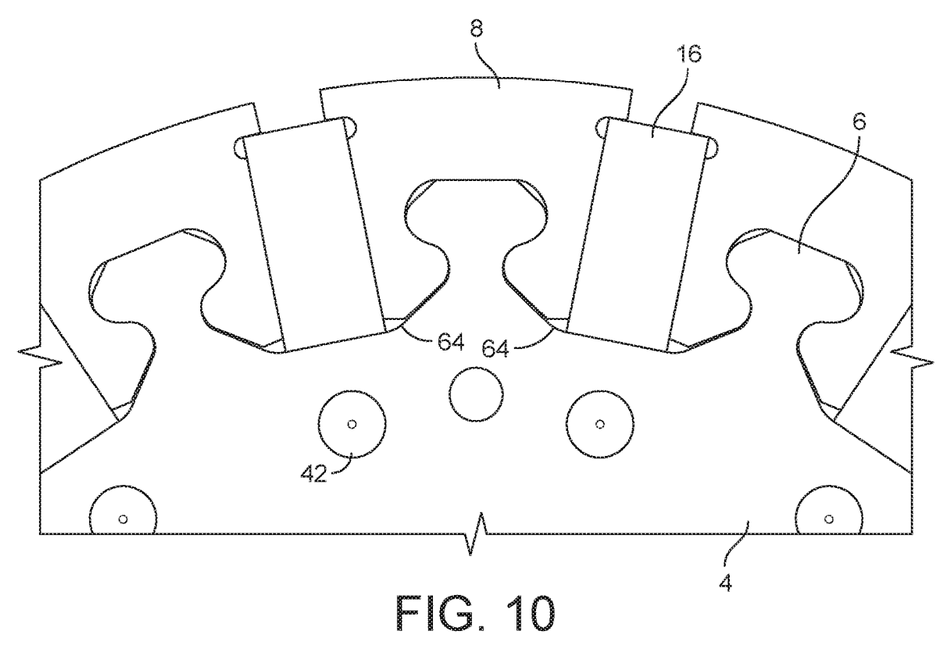
FIG. 10 is an enlarged transverse cross-sectional view of part of the periphery of the rotor.

As noted above, a series of lugs 6 is formed on the hub body and the rotor segments are shaped so as to engage with the lugs. This inter-engagement is shaped so as to resist axial and circumferential forces experienced by the lugs and segments during rotation of the rotor at high speeds. The magnets 16 are retained around the hub body by the rotor segments.

Figure 11:
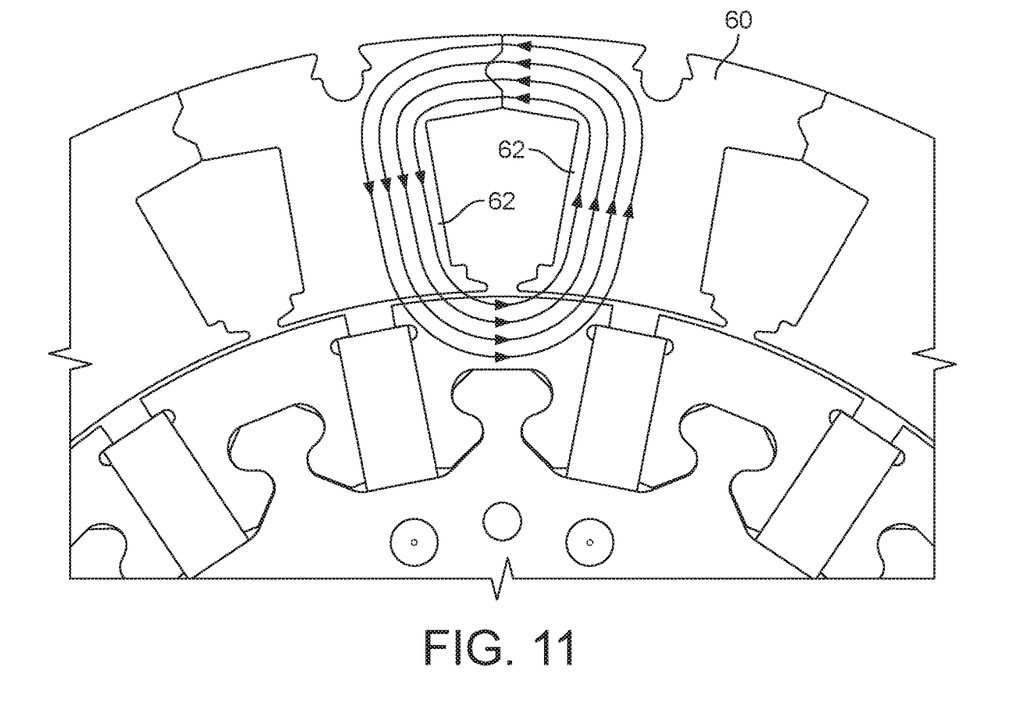
FIGS. 11 and 12 show the rotor part of FIG. 10 in combination with an adjacent motor stator at different relative rotational orientations.
Figure 12:
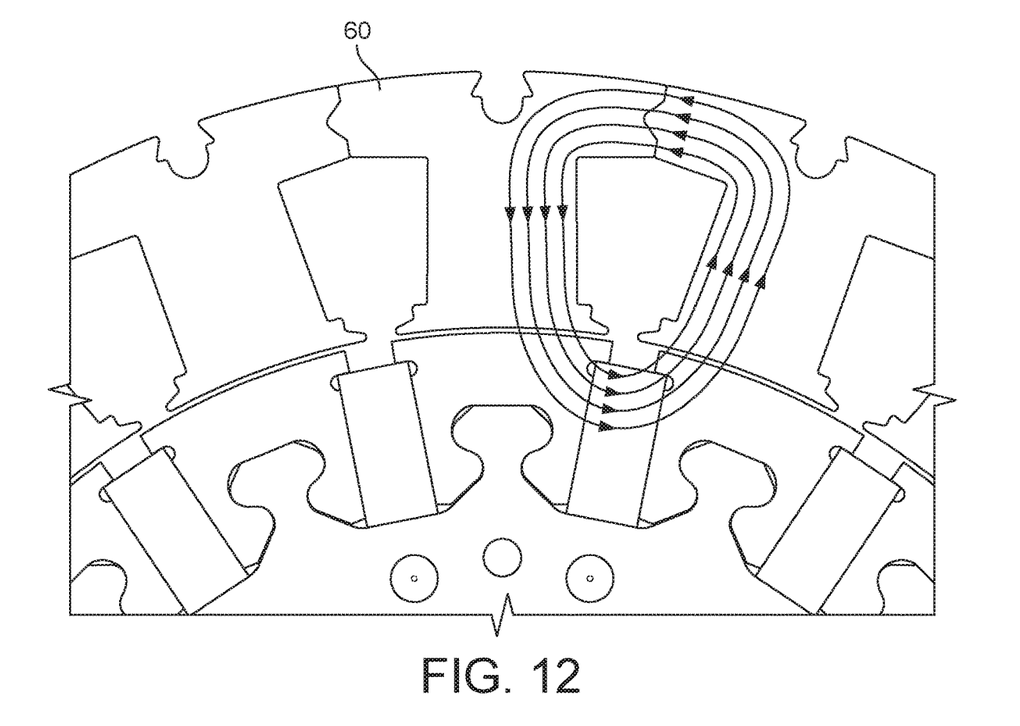

As illustrated by FIGS. 11 and 12, in addition to these mechanical properties, the lugs, rotor segments and magnets are also arranged and proportioned so as to allow a significant amount of magnet flux to run through the rotor segments and link with an adjacent stator 60 of the motor. FIG. 11 shows flux paths when each rotor segment is located between two adjacent stator teeth 62 and FIG. 12 shows flux paths when each rotor segment is aligned with a stator tooth 62. Preferably, each rotor segment provides a path for flux which is as wide in the radial direction as half the stator tooth thickness in the circumferential direction.

When the rotor segment is aligned with a stator tooth as shown in FIG. 12, the rotor segment and lug are preferably proportioned so as to provide an adequate flux path width from the outer circumferential surface of the rotor segment to the adjacent magnet. Preferably, an angle defined between a radial centre line of the rotor segment and a line extending from where this centre line meets the outer circumference of the rotor segment to tangentially intersect with the cut-out profile of the rotor segment adjacent to the head portion of the lug is less than or equal to 27.5°. This allows most of the magnet length to be effectively utilised.

Preferably, a small gap 64 is defined between the radially innermost portions of each rotor segment and the rotor hub. This serves to minimise flux leakage between the rotor segments. The segment may be shortened by about 7% of the magnet's radial height for example.

Figure 13:
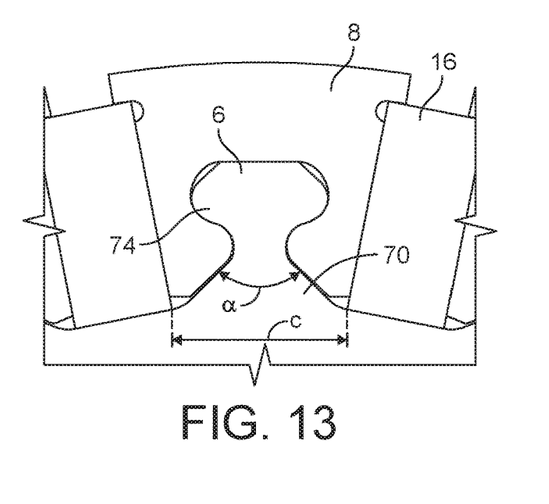
FIGS. 13 and 14 are enlarged cross-sectional views of an individual lug formed on the rotor hub body.

In order to improve the strength of each lug, it is formed with a wide base portion 70 as shown in FIG. 13. The base portion narrows in a radially outward direction to where the circumferential width of the lug reaches a minimum. The width then increases again, before finally decreasing towards the distal end of the lug, defining a head portion 74. The base portion 70 is tapered so that its width decreases continuously in the radially outwards direction. Its maximum width "c" is indicated in FIG. 13. It substantially corresponds to the available width between the adjacent magnets 16. It was determined that this configuration was acceptable from an electromagnetic point of view as those characteristics are not materially affected by removing material from this portion of the rotor segment. The strength resistance of the lug was also increased by increasing the angle "a" defined between the tapered sides of the lug in a transverse plane. In the example illustrated, this angle is around 90°.

Figure 14:
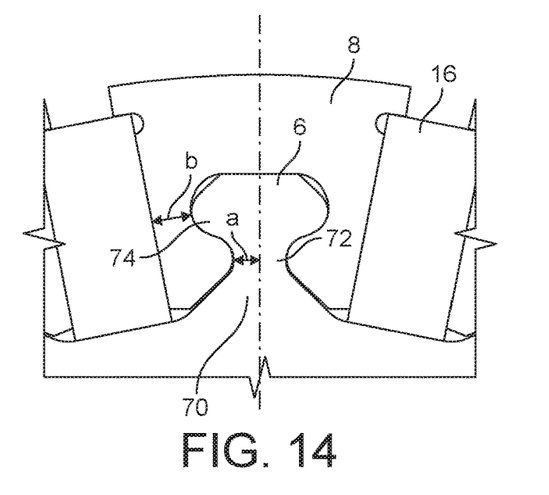

In FIG. 14, the dimension "a" is labelled, which corresponds to half the width in the circumferential direction of the narrowest portion 72 of the lug. The dimension "b" is the smallest width of the rotor segment in the circumferential direction measured between the surfaces adjacent to the head portion of the lug and the proximate magnet. In an example where the materials forming the lug and the rotor segment have similar mechanical properties and strength, the ratio of b/a is preferably around 1.5.

Figure 15:
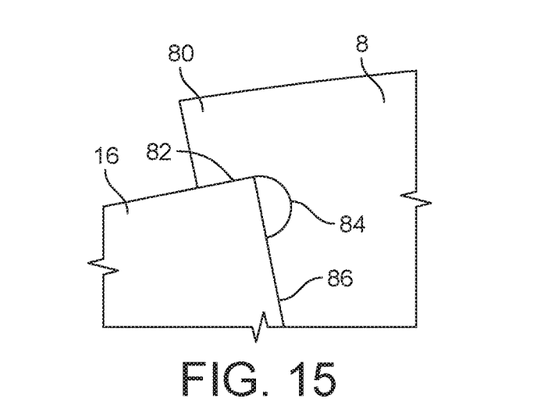
FIG. 15 is an enlarged view of part of FIG. 14.

As shown in the enlarged view of FIG. 15, a portion 80 of each rotor segment 8 extends circumferentially at least part way over the radially outermost surface of an adjacent magnet 16 to restrain the magnet against radially outwards forces. Portion 80 defines a radially inwardly facing surface 82 which engages with the magnet.

An axially extending groove 84 is defined by the rotor segment. It is formed in a sidewall 86 of the rotor segment which engages with a radially extending side surface of the magnet. The groove is located immediately radially inwardly from the portion 80. In comparison to having a right-angled profile where the rotor segment engages the corner of the magnet, this groove provides a larger radius and reduces the concentration of mechanical stress at this location during rotation of the rotor. In the example illustrated, the groove has a semi-circular cross-section in a transverse plane. This was found to give good stress resistance, whilst being relatively straightforward to fabricate, without requiring removal of an excessive amount of the rotor segment which would otherwise impair its electromagnetic performance.

The invention claimed is:

1. A hub for a rotor of a permanent magnet motor, the hub comprising:
a hub body for supporting a plurality of permanent magnets and having:
a central axis of rotation,
a fluid inlet for receiving a fluid coolant,
a fluid outlet for outputting the fluid coolant, and
fluid conduits which are coupled to the fluid inlet and the fluid outlet, wherein the fluid conduits define a set of separate fluid paths, each fluid path of the set extending radially outwardly to a region radially beneath a respective magnet of the plurality of permanent magnets, and then radially inwardly,
wherein the hub body includes a central chamber for receiving fluid coolant from the fluid inlet, with each fluid path extending along a respective separate channel directly connected to the central chamber, and
wherein the central chamber includes a plurality of vanes for imparting rotational velocity to fluid coolant flowing through the central chamber before the fluid coolant transitions from the central chamber into the channels.

2. The hub of claim 1, wherein each fluid path of the set extends radially outwardly, then axially in a region radially beneath a respective magnet of the plurality of permanent magnets, and then radially inwardly.

3. The hub of claim 1, wherein the hub body includes a set of chambers, each chamber of the set is located radially beneath a respective magnet of the plurality of permanent magnets, and each one of the set of fluid paths passes through a respective one of the set of chambers.

4. The hub of claim 3, wherein each chamber of the set is elongated in the axial direction.

5. The hub of claim 1, wherein a circumferential wall of the central chamber smoothly blends into walls which define the channels.

6. The hub of claim 1, wherein the vanes are located on a transversely extending wall of the central chamber.

7. The hub of claim 1, wherein the hub body is substantially formed from an aluminium alloy.

8. A rotor for a permanent magnet motor, the rotor comprising the hub of claim 1, and the plurality of permanent magnets supported by the hub.

9. The rotor of claim 8, wherein each magnet of the plurality of permanent magnets is elongated in the axial direction.

* * * * *